United States Patent [19]
Greenstreet et al.

[11] Patent Number: 5,297,370
[45] Date of Patent: Mar. 29, 1994

[54] PANEL SYSTEM AND CLEAN ROOMS CONSTRUCTED THEREFROM

[76] Inventors: John Greenstreet, 30106 Valleyside Dr., Farmington Hills, Mich. 48334; Joe Hillebrand, 34572 Bunker Hill, Farmington Hills, Mich. 48331

[21] Appl. No.: 873,288

[22] Filed: Apr. 23, 1992

[51] Int. Cl.⁵ .............................................. E04B 5/00
[52] U.S. Cl. ........................................ 52/287.1; 52/255
[58] Field of Search ................ 52/588, 288, 486, 255, 52/511, 579, 762, 764, 775, 241

[56] References Cited

U.S. PATENT DOCUMENTS

| | | | |
|---|---|---|---|
| 2,104,085 | 1/1938 | Leland | 72/24 |
| 3,022,869 | 2/1962 | Radek | 52/588 X |
| 3,444,657 | 5/1969 | Swanson | 52/288 |
| 3,621,635 | 11/1971 | De Lange | 52/486 X |
| 3,990,205 | 11/1976 | Davis | 52/486 X |
| 4,012,878 | 3/1977 | Ellingson | 52/288 |
| 4,127,974 | 12/1978 | Wendt | 52/288 |
| 4,214,414 | 7/1980 | Wendt | 52/288 |
| 4,553,363 | 11/1985 | Weinar | 52/288 |
| 4,722,153 | 2/1988 | Hardy | 52/255 |
| 4,763,455 | 8/1988 | Schneller | 52/255 |
| 4,845,910 | 7/1989 | Hanson | 52/288 |
| 4,903,449 | 2/1990 | Ellingson | 52/288 |

Primary Examiner—Carl D. Friedman
Assistant Examiner—Beth A. Aubrey
Attorney, Agent, or Firm—Weintraub, DuRoss & Brady

[57] ABSTRACT

A wall panel system for constructing clean rooms includes wall panels, wall studs and a "z" bracket assembly device for mounting the wall panels to the wall studs. The wall panels are covered with a protective covering of a hard core plastic laminate or a shatterproof polyvinyl chloride (PVC) which provides a sanitizing surface. Also, the system includes wall panel seam filling, internal corner covering and external corner covering to preserve the integrity of the clean room. At least one door is provided for access to the clean room and one window may be provided for viewing access to the room. The room is constructed to provide a particulate-free environment.

16 Claims, 2 Drawing Sheets

U.S. Patent     Mar. 29, 1994     Sheet 1 of 2     5,297,370
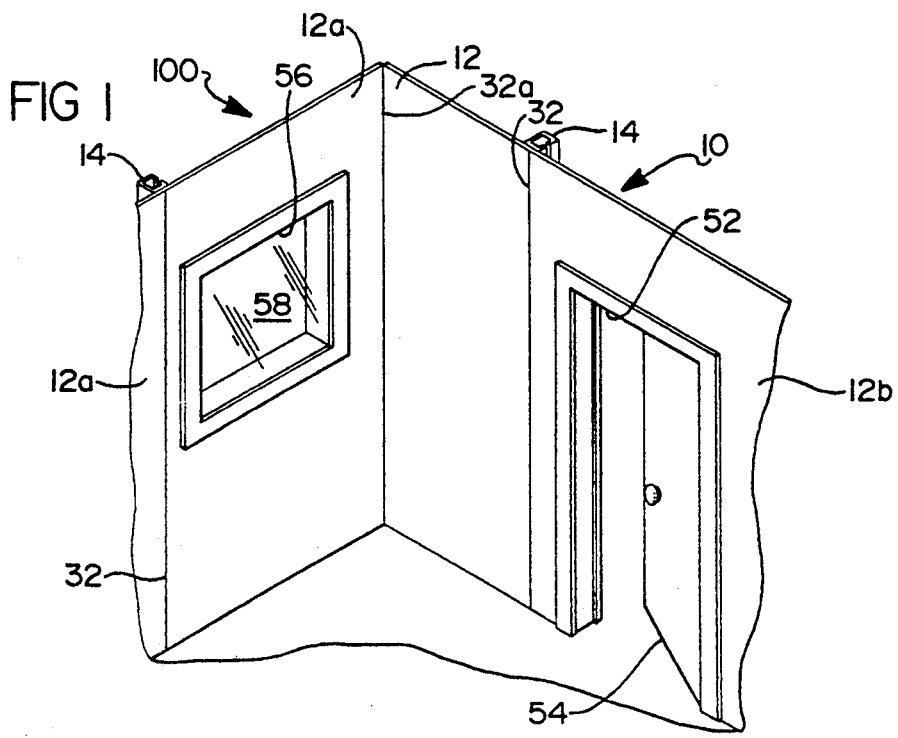
FIG 1
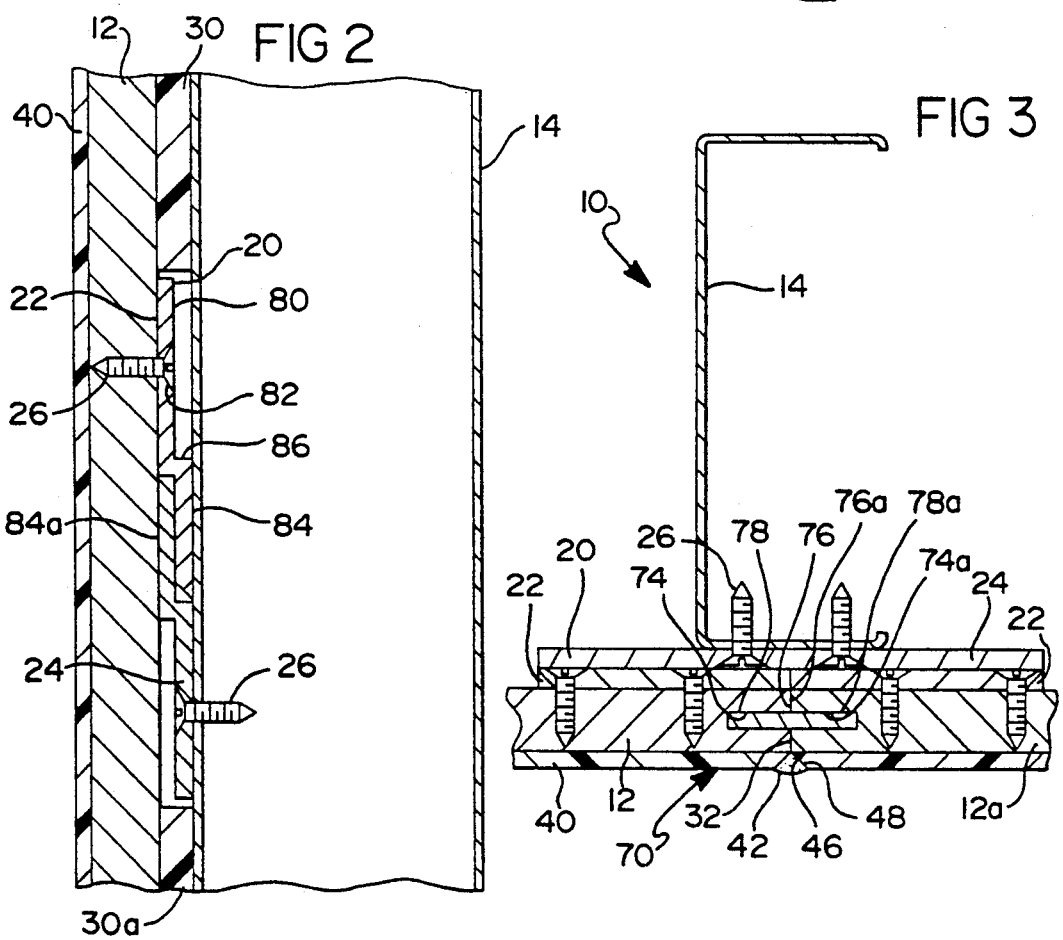
FIG 2
FIG 3

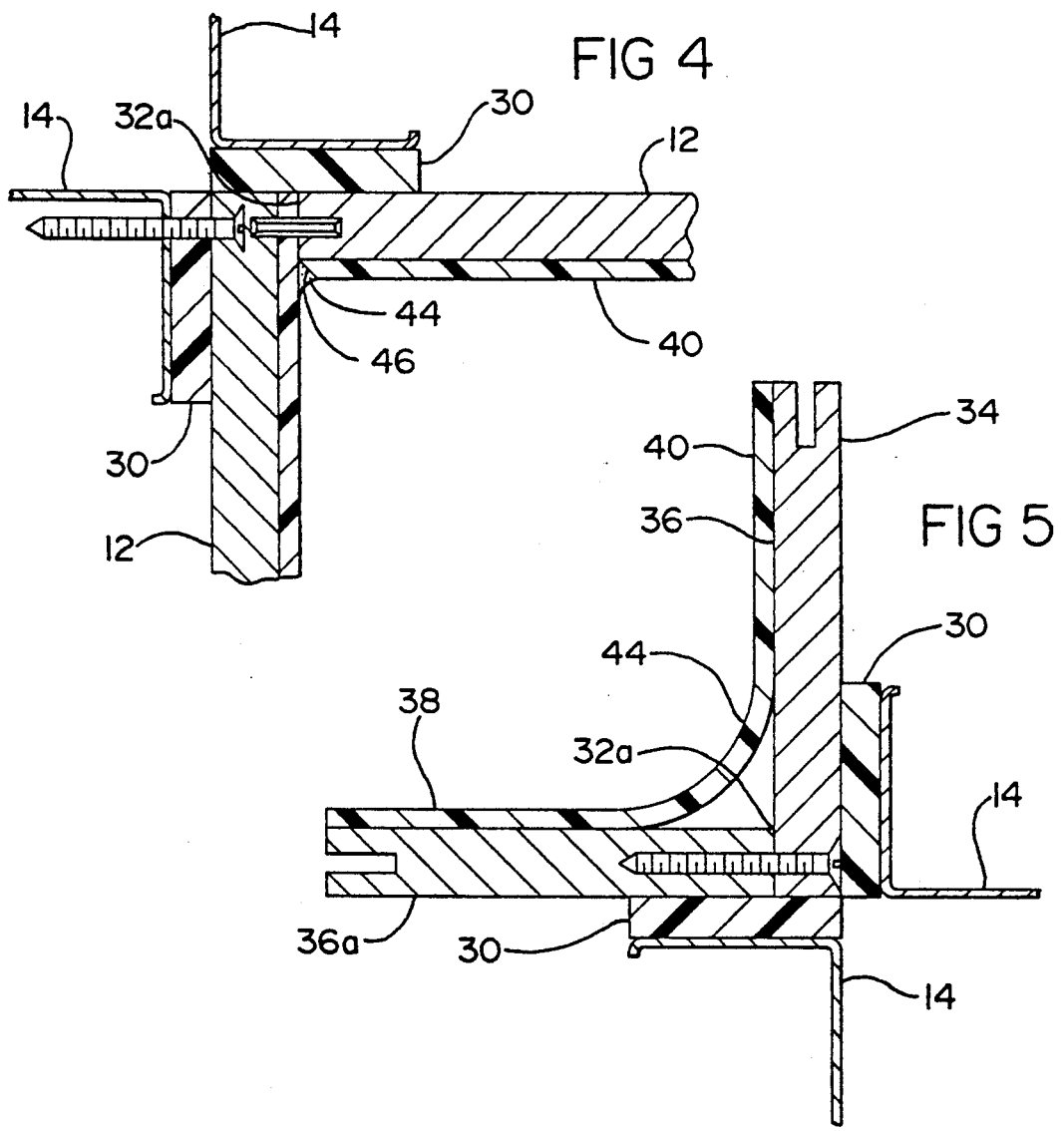

PANEL SYSTEM AND CLEAN ROOMS CONSTRUCTED THEREFROM

BACKGROUND OF THE INVENTION

1. Field of the Invention

The present invention concerns building wall panel systems. More particularly, the present invention concerns mounting assemblies for building wall panel systems. Even more particularly, the present invention concerns mounting assemblies for building wall panel systems and clean rooms constructed therewith.

2. Description of the Prior Art

"Clean rooms" are substantially particulate free structures which are used in the pharmaceutical industry and in other environments where it is a prerequisite that conditions be maintained which do not attract or generate particulates.

In constructing such rooms, it is essential that the interior of the room be capable of being maintained particulate free under all conditions. Thus, it is necessary that the number of exposed joints, seams, crevices and the like be minimized.

Traditionally, clean rooms or non-clean room wall assembly systems use some version of a batten strip or the like, such as a joining strip to unite together wall panels and to cover the gap at the wall panel intersections or joints.

For example, U.S. Pat. No. 4,028,856 discloses a panel retainer which is placed over the intersection of each adjoining panel and then screwed to a stud. The disadvantages of this type of panel retainer in a clean room environment become apparent. The number of particulate collecting areas are compounded because the retainer now provides two edges at each wall joint for particulate collection.

To eliminate the batten and to provide ease of assembly, magnetic stripping has been proposed. For example, U.S. Pat. No. 4,835,923 shows a prefabricated wall assembly system using magnets. However, the magnets act as collectors of metallic dust which will then act as a collector of other contaminants; and the magnets seriously affect the operation of electronic instruments in the clean room.

In U.S. Pat. No. 4,897,976, there is disclosed a system for assembling a total building using prefabricated wall panels and assembly fixtures. This method of assembly uses a spline and a vertical bracket to hold the panels in place. This provides a wall that is long-standing and withstands severe wind conditions. However, the system is difficult to assemble and disassemble. It is durable, but not portable. Also, there is no provision in this structure to provide for maintaining clean room integrity. The intersecting joints are all exposed and act as collection points for particulates and contaminating dust.

Thus, it would be desirable to have a wall panel assembly system which facilitates assembly and eliminates particulate and contamination collection areas. The present invention addresses these matters.

SUMMARY OF THE INVENTION

The clean room wall panel system of the present invention eliminates particulate collecting areas within the room. The clean room wall panel system of the present invention, generally, comprises:

(a) at least two wall panels, the wall panels being abuttable against each other; the wall panels having an intersection therebetween; and (b) a z-clip bracket assembly for joining the wall panels to a mounting surface, the bracket assembly comprising:
  (1) a first z-clip disposed on each wall panel; and
  (2) a second z-clip for attachment to the mounting surface, the second z-clip cooperatively engaging the first z-clip.

The panels are assembled together using the z-clips system to provide a room which is essentially free and clean of areas where particulates can collect and multiply. The z-clips are non-load bearing, but enable the wall panels to be held in place when attached to a mounting surface and without the use of exposed wall panel retainers, which overlap the wall panels and provide multiple areas for particulates and bacteria to collect. The wall panels are supported by the floor of the room.

To establish some stability between the wall and the wall mounting surface, supports are provided above and below the z-clip brackets. The supports prevent the wall panel from distorting on the mounting surface. A door panel, as well as a window opening, formed in one or more of the panels, for physical access and viewing access to the room, respectively, may be provided herein.

The wall panels of the clean room may have a protective covering on the surface inside the room or the room side surface, which is easily cleaned and sanitized. The protective covering may be a plastic laminate, such as FORMICA, or a polymeric plastic type of surface such as that sold under the mark "MIPOLAM". The protective covering is securely attached to the wall panel by any suitable means. If the wall covering is a plastic laminate, means for sealing the panel intersections, such as a laminate caulking material, may be sealingly applied to the intersection, thereby completely sealing and closing off the opening. However, if the covering surface is a "MIPOLAM", the means for sealing may comprise a welding rod which is placed between the panel intersections to seal off the opening, or alternatively, by caulking the "MIPOLAM" the seal may be achieved.

The system provides for one of two types of sealed corners within the clean room. One type is where the cornering panels meet, approximately normal to each other, in this instance the intersection is caulked or welded. The second type of seal is a pre-manufactured internal corner with a laminate or polymeric cove which creates a rounded or filleted corner which covers the corner.

For external corners that may protrude into the room, a radiused or rounded corner is usually employed.

As noted, the panels are all securely held in place to the mounting surface by the z-clip bracket assemblies. Optionally, and in addition to the z-clip bracket assembly, an alignment spline may be used which is inserted into notches formed in the intersecting ends of each panel. Where used, a portion of the alignment spline is inserted into each panel.

The above clean room panel system may be provided in a kit form, which has all the components to assemble a complete clean room therefrom. The wall assembly system provides a sanitizable, unbroken smooth surface for clean room environments.

Other objects, features, advantages and uses of the present invention will become more apparent by referring to the following description and drawings. Throughout the following description and drawings, identical reference numbers are used to refer to the same component shown in multiple figures of the drawing.

BRIEF DESCRIPTION OF THE DRAWINGS

FIG. 1 is a perspective view of a portion of a clean room showing a corner, door and window;

FIG. 2 is a side sectional view of the z-clip bracket assembly and joint support;

FIG. 3 is a plan view, in section, of the z-clip bracket assembly panels and spline;

FIG. 4 is a sectional view of an intersectional corner; and

FIG. 5 is a sectional view of a pre-manufactured internal corner cove.

DESCRIPTION OF THE PREFERRED EMBODIMENT

Referring now to the drawings, there is depicted a clean room wall panel assembly system, shown generally at 10. The clean room wall panel system 10 generally comprises:

(a) at least two wall panels 12, 12a, the wall panels 12, 12a being abuttable against each other, the wall panels 12, 12a forming an intersection 32 therebetween; and (b) a z-clip bracket assembly 20 comprising:

(1) a first z-clip 22 disposed on each wall panel 12, 12a; and (2) a second z-clip 24 for attachment to a mounting surface 14, the second z-clip 24 cooperatively engaging the first z-clip 22, the second z-clip 24 retaining the first z-clip 22 without bearing the weight of the wall panel 12, 12a, the wall panel 12, 12a being supported by a floor of the room.

Several wall panels 12, 12a, 12b, 12c, etc., mounting surfaces 14, etc., and z-clip bracket assemblies 20, etc., cooperate to define a complete clean room wall panel system 10. The wall panels 12, 12a, generally, comprise a commercially available, high density fire rates particle board. As noted, several of such panels 12, 12a, 12b, 12c, etc. are used to assemble a complete clean room. Any selected panel, such as panel 12b can have a door opening 52 formed therein defining a doorway for access to the room. A door 54 is hingedly attached to the panel 12b and is removably insertable into the door opening 52 via a conventional hinge or the like. Although not shown, a panel, per se, can define a door as opposed to providing a doorway in a panel.

The same panel 12b or another selected panel 12c can have a window opening 56 formed therein for defining a window 58. The window 58, made of glass, plastic or the like which is inserted into the window opening 56 and is sealingly attached to the wall panel 12c in a manner well known in the trade, such as by mastic or the like. The window 58 provides the ability to view into and outside the room.

Each of the panels 12, 12a, 12b, 12c and the door 54 is covered with a protective sanitary covering 40 which provides the interior of the clean room with a particulate-free surface. The covering 40 may comprise a solid core plastic laminate, such as a commercially available "FORMICA", which is securely attached to one surface of the wall panel 12. As an alternative, the covering 40 may be a polyvinyl chloride (PVC) shatterproof covering, such as that which is manufactured by Dynamit Nobel and is commercially available under the name of "MIPOLAM".

As the panels are abutted an intersection 32 is created therebetween. The intersection is, then, chamfered to form a seam or gap 48. A means 42 for sealing is applied to the seams 48 to provide a complete and secure particulate-free surface within the clean room. Before the seams 48 are sealed, as noted, the intersection 32 is routed out to create a chamfer in the covering of each panel, thus, defining the seams 48 which are, then, sealed.

If the wall covering 40 is a plastic laminate surface, the means 42 for sealing is a caulking material sealingly applied to fill the seam 48 of the wall panels. The caulking material is an FDA approved silicone rubber or the like. However, if the wall covering is a "MIPOLAM" surface, the means 42 for sealing may comprise a welding rod (not shown) which is placed into the seam. The seal, being accomplished by hot welding a welding rod of similar material into the seam 48 of the panels. As an alternative to a welding rod, corking may be used to seal a "MIPOLAM" surface.

The clean room has intersecting corners 32a, as the wall panels 12, 12a, 12b, and 12c are assembled and abutted to form the room.

Since particulates may collect in the corners, the corners are similarly sealed. Thus seams 48 are created at the corners, which are then sealed. The corner seams or gaps of the corners 32a may be sealed using the same means for sealing 42 used to seal the intersections 32 of the wall panels 12, 12a having the protective covering 40.

Alternatively, and as shown in FIG. 5, an internal corners 32a may be defined by an internal corner cove 34, as opposed to an intersection. The cove 34 comprises two panel strips 36, 36a removably attached and disposed normal to each other. The panel strips have a protective covering, which is securely attached thereto in the form of an L-shaped fillet 38. Adjacent panels are then abutted to the cove 34 and the resulting intersections 32 are then sealed as previously described.

An external corner (not shown) may be defined similar to an internal corner cove. Two panel strips are removably attached and disposed normal to each other. The panel setups have a protective covering which is securely attached to the outside surface of the corner to form an angular shaped cover. Adjacent panels are then abutted to the external corner and the resulting intersection are then sealed as previously described.

The wall panels 12, 12a are directly mounted to the mounting surface 14 using the z-clip bracket assemblies 20. As shown in FIG. 2, the z-clip bracket assemblies, generally comprise a first z-clip 22 and a second z-clip 24. The first z-clip 22 is installed to the wall panels 12, 12a by any suitable means, such as screws or the like. The first z-clip 22 includes a generally planar first section 80 having at least one hole 82, preferably two, formed therethrough to receive a fastener 26. The first z-clip 22 also includes a connecting portion 86, the connecting portion 86 is integrally formed with, and normal to the first section 80. The first z-clip 22 further includes a second section 84, the second section 84 is parallel to the first section 80. The second section 84 is integrally formed with the connecting portion 86, and slightly overlaps the first section 80 having the connecting portion 86 therebetween.

The second z-clip 24 is substantially identical to the first z-clip 22, but installed on the mounting surface 14 in an inverted position with respect to the first z-clip 22. The second section 84 of the first z-clip fits between the mounting surface 14 and the second section 84a of the second z-clip 24 when the wall panel 12, 12a is mounted to the mounting surface 14.

The first z-clip 22 is removably mounted at designated locations to each wall panels 12, 12a proximate the intersecting ends 32 of the wall panel. The second z-clip 24 is removably attached to the mounting surface 14. The first z-clip 22, in use, is removably interdigitated with the second z-clip 24, as shown in FIG. 2. Means 26 for fastening the first and second z-clips 22, 24, as shown, to the wall panels 12, 12a and to the mounting surface 14, respectively, is preferably a screw-type fastener or the like.

Several of such z-clip bracket assemblies 20 may be used at each wall panel intersection 32, the total number being determined by the number of panels 12, 12a and the height of the room. The z-clips 22, 24 are preferably made from a light metal such as aluminum or the like, or in the alternative, plastic.

The mounting surface or wall studs 14 are, generally, attached to the ceiling and to the floor and are preferably made from light metal such as steel or the like, but alternatively, the stud can be made from wood as is known by those in the architectural arts. Accordingly, the terms stud and stud channel are used interchangably herein.

The joint supports 30, 30a which, as noted, are optional, are insertable between the stud 14 and the panels 12, 12a at or near the z-clip bracket assemblies 20 are removably insertable between the stud 14 and the wall panelling 12, 12a and are made from a lightweight material such as plastic, wood or the like.

Optionally, at the intersection 32 of each panel 12, 12a, an interlocking spline 70 may be used to assist in locking or holding the panels 12, 12a in place. The spline 70 is an elongated strip having a first side 78 which is insertable into an alignment notch 74 formed in the intersecting end 76 of the wall panel 12. A second side 78a of the spline 70 is inserted into the alignment notch 74a formed in the intersecting end 76a of a second or mating wall panel 12a.

Although not shown, the clean room wall panel system 10 may be available in a pre-packaged kit form. The kit would provide all the elements required to assemble a complete clean room. Generally, the basic kit comprises:

(a) a plurality of wall panels 12;
(b) a plurality of z-clip bracket assemblies 20;
(c) a plurality of cove corners 34;
(d) a door 54; and
(3) a window 58.

Wherein the wall panels 12 and the z-clip bracket assemblies 20 cooperate to provide an assembled clean room system.

The kits may additionally provide any one or all of the following: joint supports 30, protective covering 40, means 42 for sealing, wall studs 14, external corners, splines 70, and fasteners 28.

While the wall panel assembly system 10 has been described in conjunction with clean rooms, it is appreciated and is evident that the assembly system can be used for retrofitting existing rooms and other types of fabricated room conditions. Several variations will be apparent to those skilled in the art in light of the disclosure herein.

Having, thus, described the invention, what is claimed is:

1. A clean room wall panel system comprising:
   (a) at least two wall panels, the wall panels being abutted against each other, the wall panels forming an intersection joint, each wall panel having a first side and a second side;
   (b) a z-clip bracket assembly for mounting the wall panel to a mounting surface, the bracket assembly comprising:
      (1) a first z-clip disposed on the second side of each wall panel; and
      (2) a second z-clip attached to a mounting surface, the second clip cooperatively engaging the first z-clip, the second z-clip retaining the first z-clip without bearing the weight of the wall panel; and
   (c) an alignment spline extending between the panels, each panel having an alignment notch formed therein, the spline extending into the notches.

2. The clean room panel system of claim 1 further comprising:
   at least two joint supports, the joint supports being disposed between the second side of the wall panels and the mounting surface proximate the z-clip assembly.

3. The clean room panel system of claim 1 further comprising:
   (a) a wall panel protective covering, the protective covering being disposed on the first side of the wall panels; and
   (b) means for sealing the intersections.

4. The clean room wall panel assembly system of claim 3, wherein the wall panel protective covering comprises:
   a plastic laminate surface securely attached to the wall panel.

5. The clean room panel assembly system of claim 3, wherein the wall panel protective covering comprises:
   a polyvinyl chloride wall covering securely attached to the wall panel.

6. The clean room wall panel assembly system of claim 5, wherein the means for sealing the wall panel intersections comprises:
   a silicone rubber caulking material sealingly applied to the intersections of the wall panels.

7. The clean room wall panel assembly system of claim 6, wherein the means for sealing the wall panel intersections comprises:
   welding rod sealingly applied to the wall panel intersections.

8. The clean room wall panel assembly system of claim 3, further comprising:
   an internal corner, the internal corner being a preformed internal cove, the internal corner being a solid unitary piece abutting the protective covering of the panels, the preformed cove being of the same material as the protective covering.

9. The clean room wall panel assembly system of claim 8, wherein the first z-clip comprises:
   (a) a first planar section, the first section having a hole formed therethrough to receive a fastener, the first section being attachable to the wall panel;
   (b) a connecting portion, the connecting portion being planar and substantially normal to the first section, the connecting portion integrally formed with the first section; and (c) a second section, the second section being planar and parallel with the first section, the second section integrally formed with the connecting portion.

10. The clean room wall panel assembly system of claim 8, wherein the second z-clip comprises:

(a) a first planar section, the first section having a hole formed therethrough to receive a fastener, the first section being attachable to the mounting surface;

(b) a connecting portion, the connecting portion being planar and substantially normal to the first section, the connecting portion being integrally formed with the first section;

(c) a second section, the second section being planar and parallel with the first section, the second section being integrally formed with the connecting portion; and wherein the second section of the second z-clip cooperatively receives the second section of the first z-clips mounted on the wall panels, which defines the bracket assembly.

11. The clean room wall panel assembly system of claim 8, wherein the internal corner further comprises:

(a) a pair of adjacent panel strips, the panel strips being attached to and disposed normal to each other, the panel strips having a preformed internal cove attached thereto, the panel strips abutting the wall panels; and (b) an alignment notch formed in each panel strip to receive an alignment spline.

12. The clean room wall panel assembly system of claim 1, wherein the mounting surface comprises:

a wall stud, the wall stud being anchored to a ceiling and a floor of the clean room.

13. The clean room wall panel assembly system of claim 12, wherein at least one wall panel includes:

a window, the window being sealingly attached to the wall panel, the panel having a window opening formed therein for seating the window.

14. The clean room wall panel assembly system of claim 1, wherein at least one wall panel includes:

a door opening, the panel further comprising a door being hingedly connected to the wall panel at the door opening.

15. The clean room wall panel assembly system of claim 1 further comprising an external corner, the external corner being a preformed external angular cover, the preformed external corner being the same material as the wall covering.

16. The clean room wall panel assembly system of claim 1, wherein the z-clip assembly comprises:

(a) a first z-clip attachable to a wall panel; and (b) a second z-clip attachable to the mounting surface, the second z-clip cooperatively engaging the first z-clip, to removably mount the panel to the mounting surface.

* * * * *

UNITED STATES PATENT AND TRADEMARK OFFICE
CERTIFICATE OF CORRECTION

PATENT NO. : 5,297,370

DATED : March 29, 1994

INVENTOR(S) : John Greenstreet, et al.

It is certified that error appears in the above-indentified patent and that said Letters Patent is hereby corrected as shown below:

Column 3, line 43, change "rates" to --rated--.

Column 6, line 15, after "attached to" delete "a" and insert --the--.

Signed and Sealed this

Eleventh Day of October, 1994

Attest:

BRUCE LEHMAN

*Attesting Officer*     *Commissioner of Patents and Trademarks*